Patented May 12, 1936

2,040,397

UNITED STATES PATENT OFFICE 2,040,397

ARYLAMIDES OF 5,6,7,8-TETRAHYDRO-2-HYDROXYNAPHTHALENE-3-CARBOXYLIC ACID

Heinrich Morschel, Cologne-Deutz, Germany, assignor to General Aniline Works, Inc., New York, N. Y., a corporation of Delaware No Drawing. Application November 21, 1934, Serial No. 754,181. In Germany December 8, 1933

4 Claims. (Cl. 260—124)

The present invention relates to dyestuff intermediates, more particularly it relates to compounds which may be represented by the general formula:

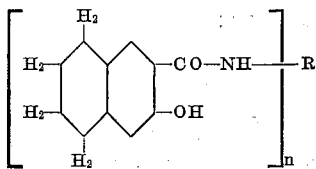

wherein R stands for an aromatic radical having more than one nucleus free from solubilizing groups and n stands for one of the numbers one and two.

My new compounds are obtainable by condensing 5,6,7,8-tetrahydro-2-hydroxynaphthalene-3-carboxylic acid with primary aromatic mono- or diamines of the carbocyclic series to the corresponding arylamides. For example, they can be prepared by reacting with a primary aromatic amine free from a group inducing solubility in water, such as an amine of the benzene-, naphthalene- or carbazole series, upon the chloride or an ester of the 5,6,7,8-tetrahydro-2-hydroxynaphthalene-3-carboxylic acid in an inert organic solvent, such as nitrobenzene, and in the presence of an acid- or water-binding agent respectively at elevated temperature, or by causing the free carboxylic acid to act upon the isocyanic acid ester of the corresponding amine. Favorably, the process is carried out by dissolving the carboxylic acid and the amine in an inert organic solvent, dropping in phosphorus trichloride at elevated temperature and boiling for several hours.

The new arylamides generally are well crystallizing colorless to yellowish-colored substances, insoluble in water, soluble in aqueous alkalies, and are valuable intermediate products for the manufacture of dyestuffs.

The invention is illustrated by the following examples, without being limited thereto:

Example 1.—192 parts by weight of 5,6,7,8-tetrahydro-2-hydroxynaphthalene-3-carboxylic acid and 158 parts by weight of 1-aminonaphthalene are heated in 1,500 parts by weight of toluene to 80° C., and at this temperature 70 parts by weight of phosphorus trichloride are dropped in within the course of one hour. After boiling for 12 hours soda is added, and the toluene is blown off with steam. The reaction product separated is filtered with suction, and for removing unchanged 1-aminonaphthalene boiled out with aqueous hydrochloric acid. The 1-(5',6',7',8'-tetrahydro-2'-hydroxynaphthalene-carbonyl)-aminonaphthalene of the formula:

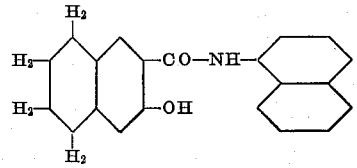

shows after recrystallizing from glacial acetic acid the melting point of 192° C.

Example 2.—211 parts by weight of 5,6,7,8-tetrahydro-2-hydroxynaphthalene-3-carboxylic acid and 122 parts by weight of 3,3'-dimethoxy-4,4'-diaminodiphenyl are heated in 1,500 parts by weight of toluene to 80° C., and at this temperature 70 parts by weight of phosphorus trichloride are dropped within the course of one hour. After boiling for 12 hours, soda is added, and the toluene is blown off with steam. The 3,3'-dimethoxy-4,4'-di (5'',6'',7'',8''-tetrahydro-2''-hydroxynaphthalene-3''-carbonyl)-aminodiphenyl of the following formula:

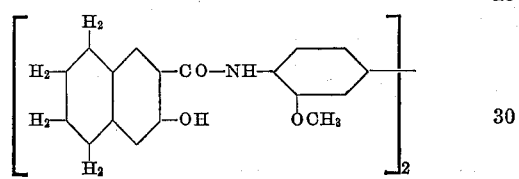

is filtered with suction, boiled with aqueous hydrochloric acid and washed with water. After recrystallizing from pyridine it shows the melting point of 292° C.

In an analogous manner the 5,6,7,8-tetrahydro-2-hydroxynaphthalene-3-carboxylic acid yields with:

| | |
|---|---|
| 2-toluidine ($CH_3=1$) | an arylamide of the melting point 164° C. |
| 4-toluidine ($CH_3=1$) | an arylamide of the melting point 200° C. |
| 2-anisidine ($OCH_3=1$) | an arylamide of the melting point 192° C. |
| 4-anisidine ($OCH_3=1$) | an arylamide of the melting point 180° C. |
| 2-phenetidine ($OC_2H_5=1$) | an arylamide of the melting point 160° C. |
| 2-chloroaniline | an arylamide of the melting point 165° C. |
| 4-chloroaniline | an arylamide of the melting point 230° C. |
| 2-phenylaniline | an arylamide of the melting point 153° C. |
| 4-phenylaniline | an arylamide of the melting point 222° C. |
| 2-phenoxyaniline | an arylamide of the melting point 168° C. |
| 2-methyl-4-methoxyaniline | an arylamide of the melting point 177° C. |
| 2,4-dimethylaniline | an arylamide of the melting point 202° C. |
| 2,5-dimethylaniline | an arylamide of the melting point 167° C. |
| 2,5-dimethoxyaniline | an arylamide of the melting point 147° C. |
| 2-methoxy-5-chloroaniline | an arylamide of the melting point 178° C. |
| 2-methoxy-5-nitroaniline | an arylamide of the melting point 236° C. |
| 2-methyl-4-chloroaniline | an arylamide of the melting point 240° C. |
| 2-methyl-5-chloroaniline | an arylamide of the melting point 181° C. |
| 3-chloro-4-methoxyaniline | an arylamide of the melting point 186° C. |
| 2-naphthylamine | an arylamide of the melting point 200° C. |

| | |
|---|---|
| 2-methyl-1-naphthylamine | an arylamide. |
| 2-ethoxy-1-naphthylamine | an arylamide of the melting point 182° C. |
| 5-methoxy-1-naphthylamine | an arylamide of the melting point 212° C. |
| 7-methoxy-1-naphthylamine | an arylamide of the melting point 199° C. |
| 1,5-diaminonaphthalene | an arylamide of the melting point above 310° C. |
| 4-aminodiphenyl | an arylamide of the melting point 222° C. |
| 3,3'-dimethyl-4,4'-diaminodiphenyl | an arylamide of the melting point 298° C. |
| 1-aminopyrene | an arylamide of the melting point 249–250° C. |
| aminochrysene | an arylamide of the melting point 236° C. |
| 2-aminocarbazole | an arylamide of the melting point 284–285° C. |
| 2-aminodiphenyleneoxide | an arylamide of the melting point 241° C. |
| 2,7-diaminodiphenyleneoxide | an arylamide of the melting point above 310° C. |

I claim:

1. Dyestuff intermediate products of the general formula:

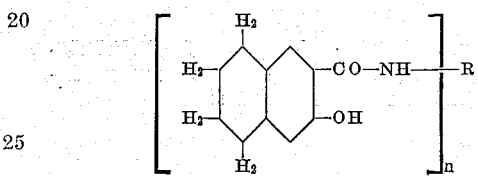

wherein R stands for an aromatic radical having more than one nucleus free from solubilizing groups and $n$ stands for one of the numbers one and two, being well crystallizing colorless to yellowish colored substances insoluble in water and soluble in aqueous alkalies.

2. Dyestuff intermediate products of the general formula:

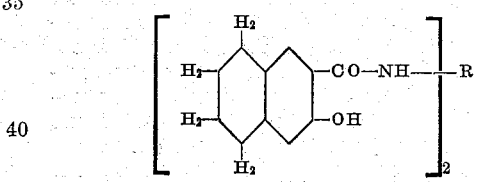

wherein R stands for a diphenyl radical free from solubilizing groups, being well crystallizing colorless to yellowish colored substances, insoluble in water and soluble in aqueous alkalies.

3. Dyestuff intermediate products of the general formula:

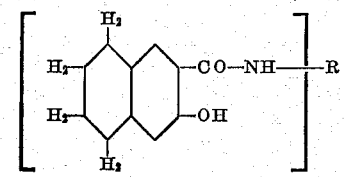

wherein R stands for a radical of the naphthalene series free from solubilizing groups, being well crystallizing colorless to yellowish colored substances, insoluble in water and soluble in aqueous alkalies.

4. The dyestuff intermediate product of the following formula:

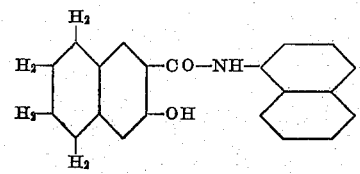

having the melting point of 192° C.

HEINRICH MORSCHEL.